United States Patent
Marion

(10) Patent No.: US 7,385,600 B2
(45) Date of Patent: Jun. 10, 2008

(54) THREE DIMENSIONAL DISPLAY METHOD, SYSTEM AND APPARATUS

(75) Inventor: Dale Scott Marion, Niagara Falls (CA)

(73) Assignee: 1614367 Ontario Inc., Toronto, Ontario (CA)

( * ) Notice: Subject to any disclaimer, the term of this patent is extended or adjusted under 35 U.S.C. 154(b) by 188 days.

(21) Appl. No.: 10/564,764

(22) PCT Filed: Jul. 15, 2004

(86) PCT No.: PCT/CA2004/001026

§ 371 (c)(1),
(2), (4) Date: Jan. 17, 2006

(87) PCT Pub. No.: WO2005/009051

PCT Pub. Date: Jan. 27, 2005

(65) Prior Publication Data

US 2006/0146047 A1    Jul. 6, 2006

Related U.S. Application Data

(60) Provisional application No. 60/487,267, filed on Jul. 16, 2003.

(30) Foreign Application Priority Data

Nov. 18, 2003    (CA) .................................. 2449982

(51) Int. Cl.
*G06T 15/00* (2006.01)

(52) U.S. Cl. .................. 345/419; 345/633; 353/10; 353/28; 359/478

(58) Field of Classification Search ................ 345/419, 345/633; 353/10, 28; 359/478
See application file for complete search history.

(56) References Cited

U.S. PATENT DOCUMENTS

| 5,257,130 | A | 10/1993 | Monroe ...................... 359/478 |
| 5,625,765 | A | 4/1997 | Ellenby et al. ............. 345/633 |
| 5,782,547 | A | 7/1998 | Machtig et al. ............... 353/28 |
| 6,478,432 | B1 * | 11/2002 | Dyner ........................ 359/858 |
| 6,481,851 | B1 | 11/2002 | McNelley et al. ............. 345/5 |
| 6,612,701 | B2 * | 9/2003 | Westort et al. ................ 353/10 |
| 6,755,533 | B2 * | 6/2004 | Fraser et al. .................. 353/10 |
| 6,875,334 | B2 * | 4/2005 | Ostrovsky ................... 205/316 |
| 7,242,315 | B2 * | 7/2007 | Affolter et al. ........ 340/815.83 |

OTHER PUBLICATIONS

Pulfrich, Carl. Die Naturwissenschaften, 1922, 10: June-September Issues.

* cited by examiner

*Primary Examiner*—Phu K. Nguyen
(74) *Attorney, Agent, or Firm*—Lang Michener LLP

(57) ABSTRACT

A system, method and apparatus for providing a two dimensional image that will be perceived by the human visual perception system as a three dimensional image is disclosed. The system and apparatus preferably employ a transparent rear projection screen onto which an image of the at least one object to be displayed is projected. The at least one object moves at perceptual speed and preferably has highlights, comprising specular highlights, ambient lighting, shadows and reflections, consistent with its display location so that the human visual perception system perceives the displayed image as a three dimensional one. The method preferably comprises surveying the display site to identify important light sources and objects and to gather a reflection map which are both used to create the final displayed image.

22 Claims, 4 Drawing Sheets

THREE DIMENSIONAL DISPLAY METHOD, SYSTEM AND APPARATUS

RELATED APPLICATIONS

This application claims benefit from U.S. Provisional Patent Application 60/487,267 filed Jul. 16, 2003 and from Canadian Patent Application 2,449,982 filed Nov. 18, 2003 and the contents of both of these applications are incorporated herein by reference.

FIELD OF THE INVENTION

The present invention relates to display systems. More specifically, the present invention relates to display methods, systems and apparatus which exploit the human visual perceptual system to provide images on two dimensional image displays which are perceived by viewers as being three dimensional images.

BACKGROUND OF THE INVENTION

Many attempts have been made in the past to provide two dimensional displays which appear to be three dimensional. In Victorian times, stereophotographs were very popular. These images were produced with a binocular camera that made two images of the object being photographed, each image's perspective being spaced from the other. When viewed with a stereopticon, which is a device that shows each of the viewers' eyes the appropriate one of the two images, a three dimensional image is perceived by the viewer.

In addition to stereophotographs, three dimensional motion pictures have been created wherein the members of the audience wear glasses, with right and left lenses either of two different color filters or with polarizing lenses having two different polarizing angles, and two motion pictures with slightly different perspectives are simultaneously projected onto the screen through filters complementary to the lenses in the glasses. This results in one eye of each audience member seeing one of the projected films and the second eye seeing another of the projected films, and the different perspectives of the films result in a perception by the audience members of a three dimensional display.

Both stereophotographs and three dimensional motion pictures suffer from disadvantages in that they require their viewers to use special hardware, the stereopticon or filter glasses, to view the image.

Another method of making a viewer perceive a three dimensional image from a two dimensional display is to employ the Pulfrich Effect, invented by Carl Pulfrich and published in *Die Naturwissenschaften*, in the June through September 1922 issues. The Pulfrich Effect makes use of an inherent effect of the human visual perception system. Specifically, a very dark filter is placed over one eye of the viewer who then observes a displayed object moving back and forth horizontally across a two dimensional display. Due to latency in how the human brain processes low light images relative to normally lit images, the viewer perceives the displayed object as moving into and out of the two dimensional display. While interesting, the Pulfrich Effect has limited practical applications and still requires special observer hardware, in this case one dark filter.

Another technique for providing a three dimensional image from a two dimensional display is the hologram. In holography, an image is captured as an interference pattern at the film. Coherent light from a laser is reflected from an object to be imaged and is combined at the film with light from a reference beam. Holograms enable the viewer to view a true three-dimensional image which exhibits parallax.

Unfortunately, holograms also suffer from disadvantages in that they are difficult to create and display and are unsuited for video, motion pictures or the like. Also, holograms have constrained angles over which they can be viewed. Further, while they do produce accurate three dimensional images of objects, the color and appearance of the resulting image is not lifelike.

A method, system and apparatus which permits the relatively easy creation and display of video images which are perceived by viewers as three dimensional displays, without requiring the viewers to use any special hardware, is desired.

SUMMARY OF THE INVENTION

It is an object of the present invention to provide a novel system, method and apparatus of creating and displaying two dimensional displays that are perceived as three dimensional displays.

According to a first aspect of the present invention, there is provided a method of creating a final image which, when displayed at a target location, is perceived by viewers as being three dimensional, comprising the steps of: (i) selecting a target location for the display at a display site; (ii) capturing video of at least one object to be displayed in the final image, the at least one object moving in the video at a necessary perceptual speed by translating generally along a plane extending through the eyes of expected viewers and/or rotating generally about an axis perpendicular to said plane; (iii) displaying the final image at the site onto a transparent screen positioned such that the final image appears at the target location in front of a background and such that the movement of the at least one object at the perceptual speed occurs.

Preferably, for rotation of the at least one object, the perceptual speed is in the range of from about 0.8% to about 10% of the size of the at least one object, and more preferably the perceptual speed is in the range of from about 1% to about 8% of the size of the at least one object and yet more preferably the perceptual speed is in the range of from about 3% to about 5% of the size of the at least one object. Preferably, for translation of the at least one object, the perceptual speed is in the range of from about 3% to about 12% of the size of the at least one object and more preferably the perceptual speed is in the range of from about 4% to about 6% of the size of the at least one object.

Also preferably, the method of the present invention further comprises the step of, prior to step (ii), surveying the display site to identify and characterize light sources and objects which would result in visual highlights on a object displayed at the target location and in step (ii) the video of the at least one object to be displayed is captured under a recreation of the characterized light sources and objects surveyed at the target location.

According to another aspect of the present invention, there is provided a system for displaying on a two dimensional display at a target location a final image of at least one object, the final image being perceived by viewers as a three dimensional image, comprising: a transparent screen onto which the final image is displayed allowing a background behind said screen to also be viewed where not obscured by said final image; a projector to display the final image onto the screen; and a video source providing a final image to the projector, the final image having at least one object moving at perceptual speed upon said screen.

According to yet another aspect of the present invention, there is provided a method of having the human visual perception system perceive an observed image of at least one object on a two dimensional display at a target location as a three dimensional image, comprising the steps of: (i) moving the at least one object in the image such that a point on the at least one object along a plane of the expected viewers eyes occurs at a perceptual speed; (ii) applying visual highlights to the at least one object in the image, the visual highlights including specular highlight and shadows appropriate for the object at the target location; and (iii) obtaining a wide angle image of the surroundings of the target location and applying this wide angle image as a reflection map to the final image of the at least one object.

The present invention provides significant advantages over two dimensional displays for purposes such as advertising and marketing, museum displays, educational system, etc. wherein the extra attention that a three dimensional display can attract will be most beneficial. By producing a final image which has been tailored to exploit appropriate characteristics of the human visual perception system, a simple yet effective display is obtained.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
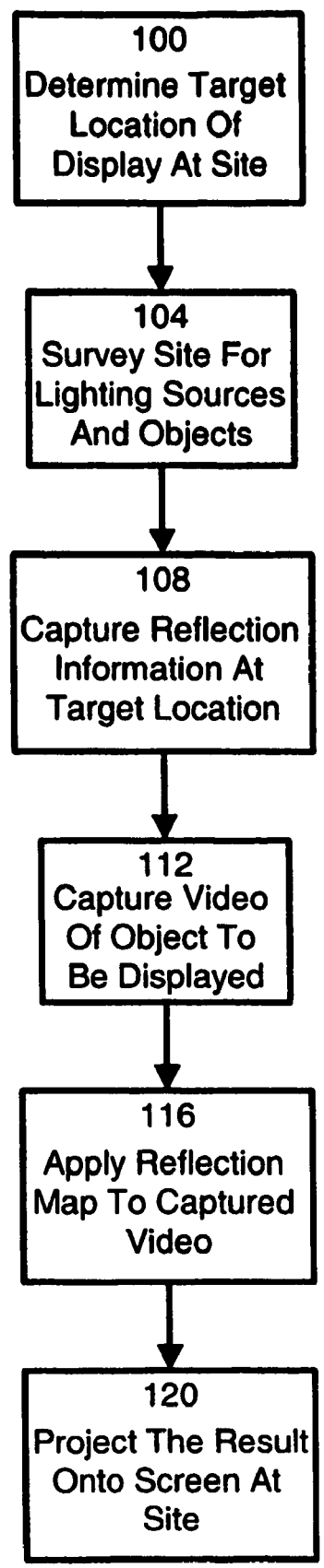
FIG. 1 shows a flowchart of the method of forming a final image in accordance with the present invention.

The present inventor has determined that, by exploiting characteristics of the human visual perception system, a display of a properly constructed and displayed two dimensional moving image can be perceived by viewers as a three dimensional display, without requiring the viewers to use special viewing hardware.

Specifically, the present invention employs the fact the human visual perception system will, under certain conditions, perceive the display of a moving object displayed in front of a background as being three dimensional, provided that sufficient movement, either rotation or translation, of the object occurs and that certain other conditions are met. It is believed that this occurs due to the way the human visual perception system detects vertical edges of viewed objects for each eye. While not presently well understood by the inventor, it is believed that the processing by the human visual perception system of the vertical edges of the images viewed by each eye results in a perception of three dimensional parallax when viewing a displayed two-dimensional object undergoing sufficient movement in front of a background.

The present invention can also further enhance the perception of three dimensionality experienced by viewers, by having the displayed object display visual highlights (e.g.—specular highlights, shadows, reflections of surroundings, etc.) that are appropriate for the object's surroundings.

As will be apparent, to exploit these characteristics, there are some limitations on the composition and positioning of the image to be displayed. Specifically, the above-mentioned characteristics of the human visual perception system cannot be exploited to display still images as the image must move, either by rotating about an axis or by translating across the display or some combination of both, at a sufficient rate as discussed below. Further, advantageously objects to be displayed should have at least portions of their surface likely to create visual highlights as they rotate or translate. Further still, if a displayed object passes off of the left or right side of the display screen, the perception of it being three dimensional tends to disappear and thus such movements should be avoided if possible. Finally, the displayed object or set of objects must be displayed in front of a background which is visible to the viewer when viewing the displayed object.

However, by creative construction of the image, these limitations can be effectively dealt with. For example, if a displayed object is being rotated to provide the perception that is it three dimensional, the displayed object or set of objects can also be moved vertically, or can be translated while rotated, to maintain the viewer's visual interest in the display. Also, the viewpoint for the objects can be "zoomed" in, or out, to accomplish some or all of the sufficient rate of movement. Also, an object which does not have the desirable surface characteristics to display visual highlights can have other objects, such as logos, text, etc. with the desired surface characteristics included in the image with the displayed object. These other objects can also, themselves, be perceived as being three dimensional by moving at a sufficient rate and/or moving in front of or behind other displayed objects. Also, if a projected background image is used with the display, as described below, the object can be stationary while the background moves, as discussed further below.

As should now be apparent to those of skill in the art, by creative design and projection of the final display, successful results can be obtained in a variety of manners, without unduly limiting the displayed subject matter.

Figure 2:
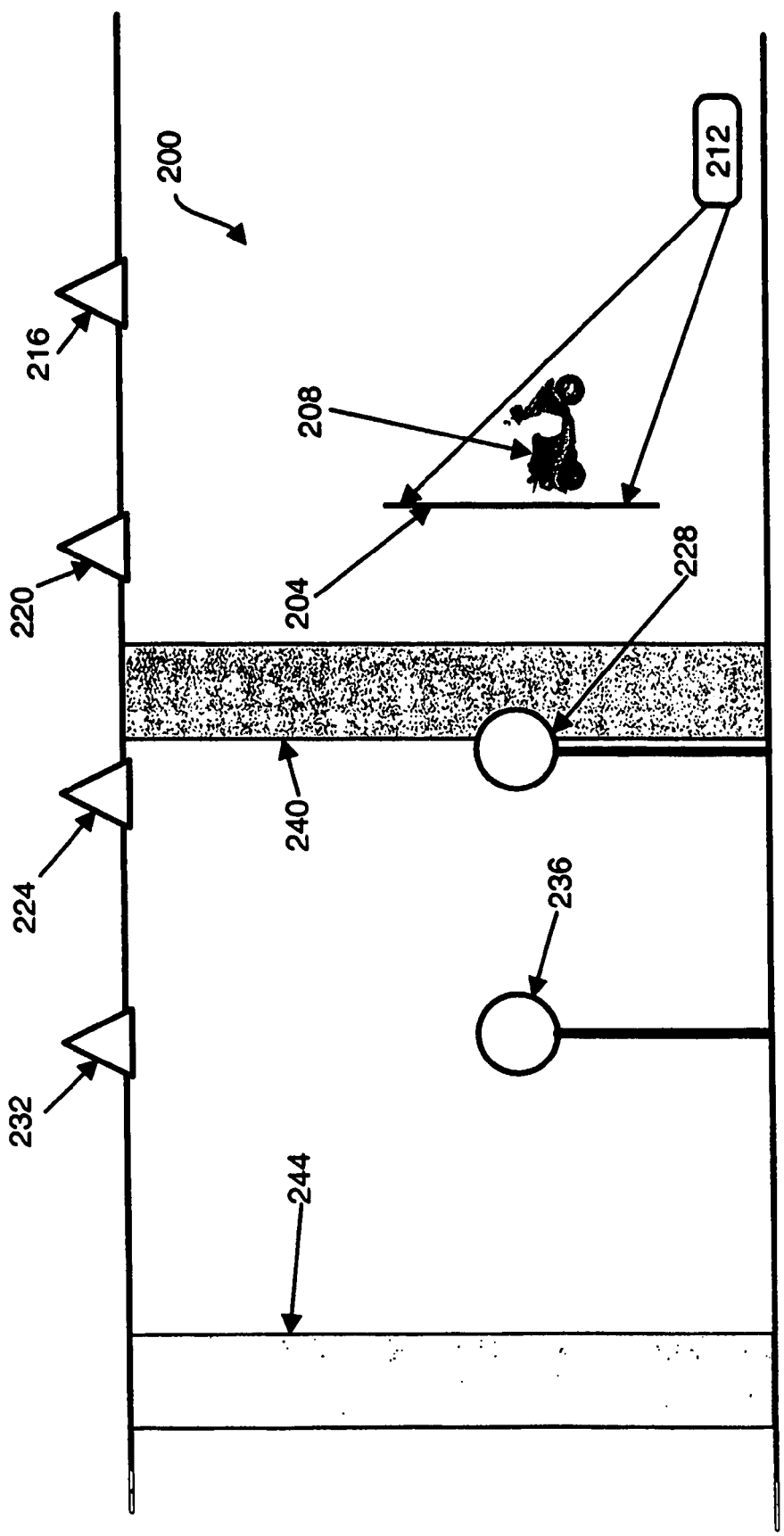
FIG. 2 shows a schematic representation of a possible display site for a final display produced in accordance with the method of FIG. 1.

FIG. 1 shows a flowchart of a presently preferred method of creating an image for a two dimensional display, which will be perceived as displaying three dimensional objects. At step 100 the site at which the display is to be shown is examined and a location for the display is determined. FIG. 2 shows a schematic representation of a site 200 at which a display may be shown. Site 200 can be an area within a booth for the floor of a trade show, an area within a consumer store, a location within a museum, etc.

In FIG. 2, a location, hereinafter the "target location" has been selected an appropriate distance behind a screen 204 on which the finished image 208 is to be displayed. The target location is the location and viewing distance at which the objects will appear to be located when displayed on screen 204. For example, it may be that, as described below, the object, or objects, to be displayed appears to be located two feet behind screen 204.

In a presently preferred embodiment of the invention, screen 204 is a clear rear projection screen, such as a HoloPro™ rear projection screen, sold by ProNova USD, Inc., Hoboken N.J. A projector 212, which can be any suitable video projector, a motion picture projector, etc., is located behind and appropriately aimed at screen 204 such that an image 208 projected by projector 212 will be displayed on screen 204. Projector 212 can be connected to any suitable video source, such as a computer system, DVD or videotape player, film, etc. Screen 204 is transparent even while displaying the final image and thus observers of the final image can see through screen 204, about the displayed objects, to observe the background behind screen 204.

At step 104 of FIG. 1, a survey is performed of the site where the display is to be located. In this survey, light sources which would create visual highlights on real objects located at the target location are identified and their location with respect to the target location and their output levels are recorded. While this step is not essential, especially if the objects of the final image to be displayed are not likely to experience visual highlights, it has been found to produce a better three dimensional effect in most cases.

In FIG. 2, ceiling lights 216, 220 and 224 and floor lamp 228 would be identified and their positions relative to the target location are recorded, along with their respective lighting levels at the target location. While it is preferred that a directional light meter be employed at the target location to determine the light received from each of the identified light sources, this level of accuracy is not generally required and reasonable estimates of the amount of light received from each light source can be employed instead. Any identified colored light sources are also quantified with respect to their color in addition to their intensity.

In the survey, it is only necessary to identify and consider light sources which will contribute enough light to create visual highlights at the target location, hereinafter "light sources of interest". Thus, in FIG. 2, ceiling light 232 has been omitted from the survey, as has floor lamp 236, as both of these light sources deliver too little light to the target location to create visual highlights at the target location.

Also in the survey, any objects which obscure part of a light source of interest are identified. In FIG. 2, pillar 240 is identified as it will obscure light from ceiling light 224 and floor lamp 228 and the general geometry of pillar 240, the fact that it extends from floor to ceiling and has a width of one foot, is noted. As pillar 244 does not obscure any light source of interest, it is omitted from the survey.

To simplify the survey process, it is also possible to merely consider objects and/or light sources within a volume of interest about the target location. In a present embodiment of the invention a sphere centered at the target location and with a ten foot radius has been successfully employed as a volume of interest within which to identify light sources and objects to be included in the survey. As will be apparent to those of skill in the art, different sized spheres of interest, or other volumetric shapes of interest, can be employed under differing conditions. For example, if the ceiling lights in FIG. 2 are high output gas discharge lamps (such as mercury vapor lamps) a sphere with a radius of larger than 10 feet may be employed. Similarly, if the ceiling lights of FIG. 2 are low level lights, such as dimmed halogen lights, or indirect lighting sources, a sphere with a radius of less than ten feet can be employed as these lights are unable or unlikely to result in visual highlights on a object displayed at the target location.

Generally, the intent is to perform the survey within a volume of interest which encompasses all lights and/or objects which can create visual highlights on a real object located at the target location. If a light meter is employed to measure light levels received at the target location from various sources, then an appropriate volume can effectively be selected as objects of interest will be readily identifiable.

After the survey has been successfully completed, the process continues at step 108 where reflection information is captured at the target location. Specifically, a panoramic photograph is taken, centered at the target location, around a plane parallel to the floor of the location. This panoramic photograph can be captured with a commercially available panoramic camera or, as in a present embodiment of the invention, the panoramic photograph is constructed from a series of six or more overlapping photographs, taken from the target location at appropriate headings, such as 60 degree headings when six photographs are employed, and which are subsequently "stitched" together with a suitable software program, such as Adobe Photoshop™, MGI's Photo Vista™ or any other digital image processing software which provides this capability. As described below, this panoramic photograph will be utilized to add reflections to the final image of objects at the target location.

While the use of a panoramic photograph is preferred, it is also possible to use a wide angle photograph of the area of interest about the target location covering less than a three hundred and sixty degree panorama. As reduced a photograph as one covering one hundred and eighty degrees has been successfully employed by the present inventor, and it is contemplated that even smaller photographs may be employed, but for the best results a full panoramic photograph is presently preferred. Again, while it is preferred to obtain and employ such a panoramic photograph to provide reflection information for the final display, in some circumstances, such as where the final display does not display reflections (e.g.—it has a matte or other non-reflective surface) this step can be omitted.

At step 112, the process continues with capturing video of the object or objects to be displayed. There are presently two techniques for capturing video of an object to be displayed, the first technique for real objects and the second technique for virtual objects.

If the objects to be displayed are real, then the survey information obtained in step 104 is used to construct a mocking stage. The mocking stage recreates the lighting conditions and effects of the objects of interest, such as pillar 240, which exist at the real target location such that, when the objects to be displayed are located at a target location on the mocking stage, they are subject to the visual highlights, including specular highlights, shadows, ambient light levels and colors and the other lighting characteristics to which they would be subject at the target location at the site. As will be apparent to those of skill in the art, the mocking stage need not be constructed on a 1:1 scale and can instead be scaled to a reasonable size, as needed, by scaling the physical relationships between the lights and objects of interest and the target location and by adjusting the lighting levels of the light sources on the mocking stage corresponding to the scale changes.

The back of the mocking stage is provided with a chromakey back drop to allow for removal of the background from the captured video image which is important so that the viewers can see through screen 204 to the background behind the display except where the objects appear. As is known to those of skill in the art, chromakeying allows for the removal of undesired backgrounds or objects from video images, by removing any portion of an obtained image which has a specified color. Thus an object place in front of a blue, or green, etc. backdrop can be filmed and the background will be removed by the chromakey system.

Once the mocking stage is constructed, the objects are placed at the target location of the mocking stage and the camera is placed at the location where screen 204 would be with respect to target location at the site. As will be apparent, the focal length of the lens on the camera is selected such that the filmed object will appear at the right size and at the desired distance behind screen 204 when projected.

If no survey has been performed, a general lighting set up can be employed for filming the objects. This general lighting set up preferably will produce some specular highlights on the objects, without producing effects that would be perceived by viewers as being obviously wrong, and providing required lighting levels for capturing the final images of the objects.

As mentioned above, the present inventor has determined that one factor in having the human visual perception system consider a displayed object as a three dimensional image, is movement of the object at a sufficient rate. The movement can be translation or rotation of the object about an axis extending generally perpendicularly to a plane extending between the intended viewer's eyes, or a combination of rotation and translation.

If desired, the axis of rotation can be less than perpendicular to the plane, by as much as forty degrees from perpendicular, although it is presently preferred that the axis of rotation be no more than twenty five degrees from perpendicular for best results, but the minimum required rotational speed for the object, discussed below, increases as the axis departs from perpendicular as will be apparent to those of skill in the art. In most cases, the plane through the viewers eyes will be horizontal plane, although it may have different orientations if the viewers are not expected to be in an upright position, etc.

A turntable or other mechanism is employed to rotate or translate the objects at the desired orientation and speed. This turntable, or other mechanism, is also colored such that it is removed from the captured video image by the chromakeying system. The rotational and/or translational velocity of the object, necessary to take advantage of the characteristics of the human visual perception system to make the object appear as three dimensional, can be determined empirically, for example by capturing video of the object and displaying the result on screen 204.

The present inventor has determined that a rotational velocity which results in a movement of the outer edges of the final projected image of the object moving at least 5% of the size of the object, as measured parallel to a plane through the viewer's eyes, per second is an approximate minimum rotational velocity, although other rotational velocities will be appropriate in other circumstances. In other words, if an object measures three inches across on the above-mentioned plane, the rotational velocity should be selected such that a point on the object will move 5% of those three inches, along the plane, in one second. In other words, a point on this object on the plane of the viewer's eyes should move about 0.15 inches along the plane in one second. As will now also be apparent, if the object is rotating about an axis which is not perpendicular to the plane, the rotational velocity of the object required to achieve the movement of the outer edges of the object with respect to the plane, will be higher than the rotational velocity required if the rotational axis was perpendicular to the plane.

While it is contemplated that values as low as 0.8% can work in some circumstances, for example with objects that fill a significant portion of screen 204 when displayed, the present inventor has determined that, for the best results, a value of at least about 3% is desired. In some cases, values as high as 10% can be employed, although more commonly values between 1% to 8% are believed to be optimal.

If the object is translating, rather than rotating, values as low as 3% and as high as 12% can be employed, but it is preferred that values in the range of 4% to 6% be employed with 5% being believed to be optimal in many circumstances. At 5%, a three inch wide object translating from one side to the other should move fast enough that its edges cover 0.15 inches in a second. If the object is both rotating and translating, the translation and rotation rates need to be selected such that a point on the edge of the object still moves at the selected desired rate (i.e. 5%) of the size of the object along the plane of a viewer's eyes. Thus if the object is rotating clockwise about an axis orthogonal to the plane, so that the front of the object is rotating right to left, and the object is also translating right to left, the speed of the rotation is added to the speed of translation for an observed point on the object and each movement can be slower than would be required on its own.

Conversely, if the object is rotating clockwise and translating left to right, the speed of the translation is subtracted from the speed of the rotation and thus the speed of rotation would likely have to be increased to ensure that the desired movement, of for example about 5%, is still obtained.

Once the required movement of the objects is arranged, the objects are captured with the camera as the objects are rotated and/or translated for the required period of time. The captured image is then processed by the chromakey system to remove the background, turntable and any other undesired components.

If multiple objects are to be displayed and it is inconvenient, or impractical, to capture them simultaneously with a camera (for example if different objects need to move at different speeds), the capture step can be repeated with various objects and the resulting captured video need then only be composited together in a conventional manner.

It should be noted that the above-mentioned requirements for translational and/or rotational movement of the objects is actually not an absolute, but is instead relative to the background in the viewer's visual field. Thus, if the background which will be visible to a viewer of the final display is moving, the object can be motionless if the background moves about 5% relative to the size of the object along a plane extending through the viewer's eyes. Moving backgrounds can be obtained in a variety of manners including physically moving the background or projecting a moving image onto a background wall or screen behind screen 204.

For example, the above-mentioned three inch object can be motionless if a background wall covered with projected spots has those spots moving behind the object left to right or right to left at 0.15 inches (as visually perceived at the target location) per second. The required degree of movement between an object and a displayed background is relative and thus if both the background and the object are moving, only their net difference in their speed of movement must equal about 5%. In our example of the three inch object, if the background moves left to right at 0.06 inches per second, then the object would need to translate from right to left at 0.09 inches per second to achieve the desired rate of movement on 0.15 inches.

If the objects to be displayed are not real, but are instead virtual objects comprising objects modeled and rendered by a three dimensional computer rendering system, such as Avid' SOFTIMAGE 3D, Alias' Maya, etc., a similar procedure to that described above for real objects is followed. Specifically, either a general lighting configuration or, preferably, a lighting configuration that matches that determined in step 104 is defined for the rendering of the object models and any objects of interest, such as pillar 240 are also modeled and positioned in the lighting configuration for the rendering. The camera (i.e.—the rendering viewpoint) is defined at the target location in the rendering and an animation is then defined for the objects, the animation defining the rotation and/or translation of the object. The same conditions exist for the speed of movement of the virtual objects as discussed above for real objects. The animation of the objects is then rendered, under the defined lighting conditions, to capture the necessary video.

This desired rate of movement of the object(s) described above is referred to herein as "perceptual speed" as this is the rate of movement required to have the viewer perceive the two dimensional final image as being a three dimensional one.

At step 116, a reflection map is applied to the captured video of the real or virtual object, the reflection map being constructed from the panoramic photograph obtained at step 108 and, when applied, results in reflections of objects and the surroundings at the target location of the site being visible on appropriate portions of the final displayed image of the object. In the case of a real object, the reflection map is created from the panoramic photograph and applied to the captured video of the object with commercially available software, such as Combustion Studio or Adobe Photoshop. In the case of virtual objects rendered by a computer 3D animation system, the reflection map can be included in the rendering process. If a background is to be included in the final image, it can also be composited into the image at this point. Again, the inclusion of the reflection map is not an essential step of the present invention, especially where the object(s) to be displayed are incapable of displaying reflections, but it is a preferred step in that it increases the perception of the objects in the final display as being three dimensional.

As mentioned above, the display of visual highlights (e.g.—specular highlights, reflections of surroundings, etc.) on the object in the final image that are appropriate for the object's surroundings, exploits the characteristics of the human visual perception system such that the viewer will attempt to perceive the display as a three dimensional one. The combination of appropriate movement of the object in the final image and the presence of the correct visual highlights lead the viewer's visual perception system to see the final image as being three dimensional.

Finally, at step 120, the resulting finished image 208 is projected, by projector 212 onto screen 204 at the site. The final image can be provided to projector 212 from a computer system, DVD, or can be rendered to film and projector 212 will be a motion picture projector, etc.

As mentioned above, it is presently preferred that screen 204 be a clear rear projection screen and thus the displayed image 208 is displayed flipped (mirror imaged) from the orientation it was captured in (this mirror imaging can be achieved by mechanical means—a mirror in the projection path—or via the image processing or animation software used to create the final image. However, it is also contemplated that front projection screens can be employed and, in such a case, no mirror imaging of the final image will be required.

The embodiment discussed above contemplates a final image that has been prepared and created prior to showing the display. It is also contemplated that the final image can be created in real time, or near real time, in other circumstances. While the embodiment above provides good results, the overall effect can be further improved if the final image is created in real time to display visual highlights of the current environment of the display. For example, no viewing audience is included in the reflection map determined at step 108. As used herein, the term "real time" is used generically to describe a situation wherein updates are provided within the bounds of the perception of the human visual perception system. It is not presently believed to be necessary to update visual highlights such as reflections more than about once every one or two seconds.

Accordingly, in a real time embodiment of the present invention, the reflection map, including the viewing audience and other surroundings, can be captured from one or more cameras mounted about screen 204 and a new, updated, reflection map is created at appropriate intervals. This updated reflection map can then be applied to the captured video of the object, if it is a real object, or used to re-render the object if it is a virtual object, and this updated image is then used as the final image on screen 204. As will be apparent to those of skill in the art, significant computational resources may be required to perform the processing of the final image to update the reflection map, but such resources are readily available and their costs are decreasing rapidly.

Figure 3:
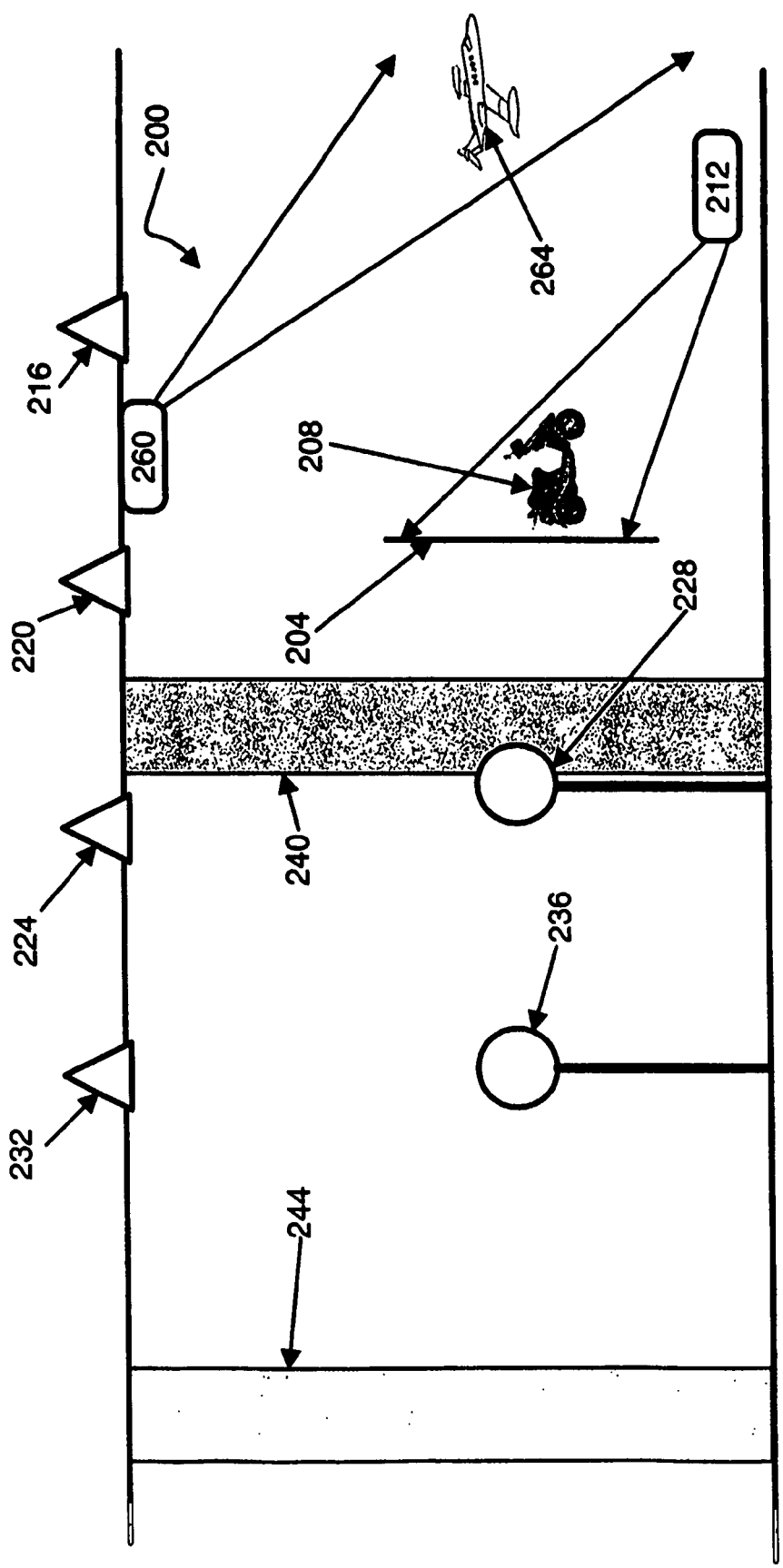
FIG. 3 shows the schematic representation of FIG. 2 also including a background projector.

In the embodiment of FIG. 2, a single screen 204 and single projector 212 are provided which allows viewing of the final image over the viewing angle supported by screen 204. FIG. 3 shows the embodiment of FIG. 2 wherein a second projector 260, which can be a video of motion picture projector, displays a moving image 264 onto the background which will be visible to viewers of the final image on screen 204.

Figure 4:
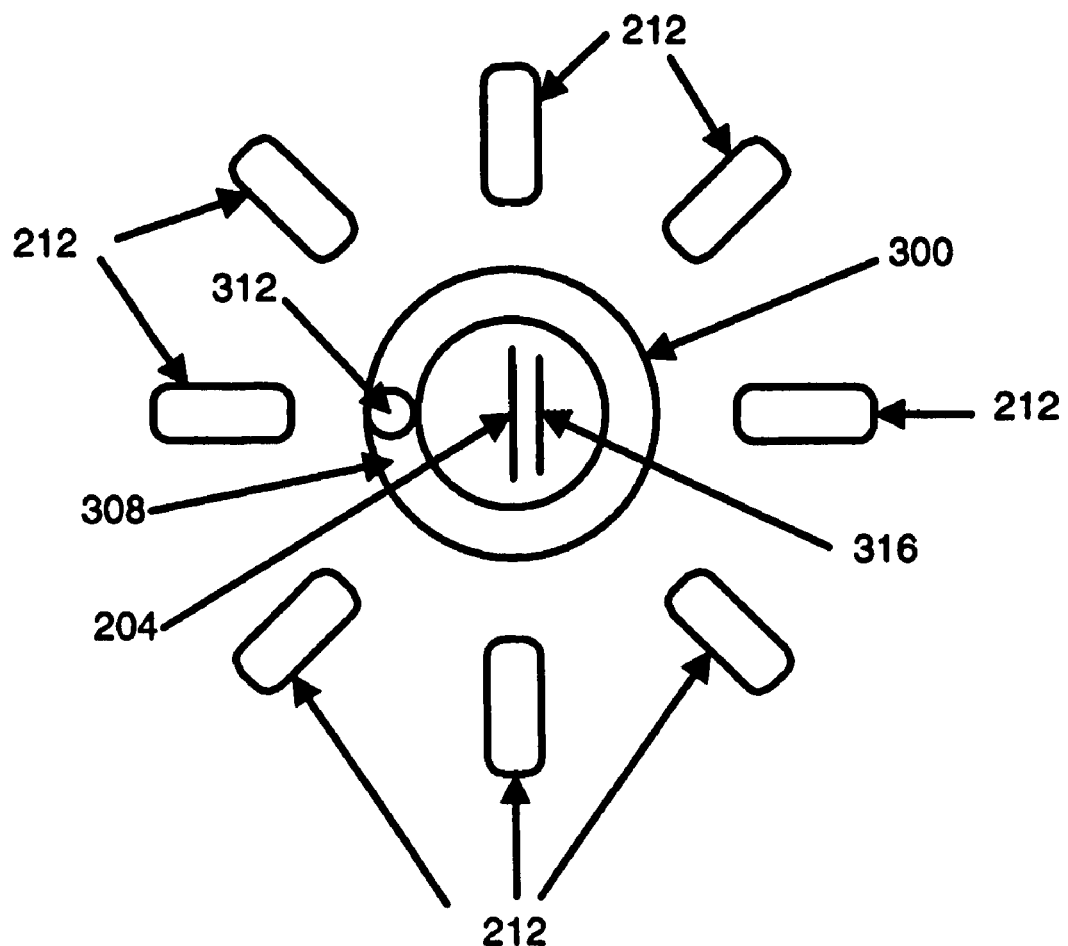
FIG. 4 shows a top view of a display system in accordance with another embodiment of the present invention.
Figure 5:
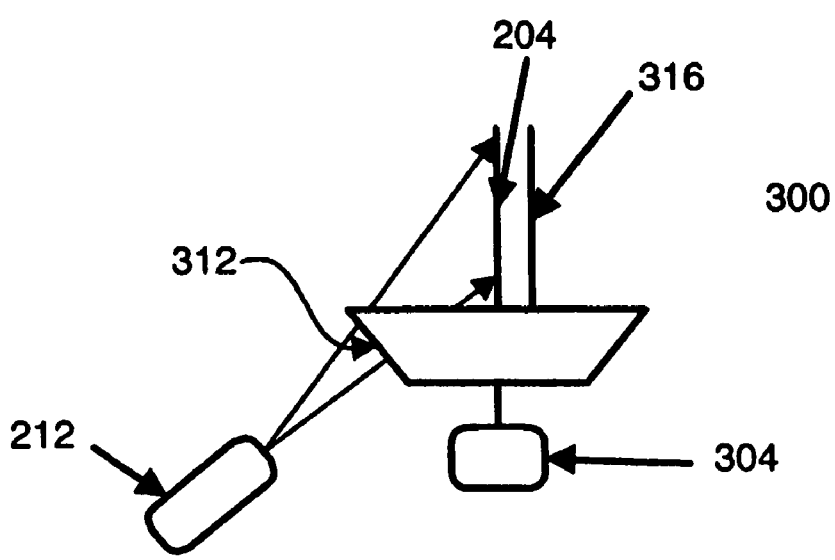
FIG. 5 shows a side view of the embodiment of FIG. 4.

FIGS. 4 and 5 show another embodiment of the present invention wherein screen 204 rotates and multiple projectors 212 are employed to provide appropriate final images over three hundred and sixty degrees of viewing.

Specifically, in this embodiment, screen 204 is mounted to the center of a dish-shaped turntable 300 which is rotatably mounted to motor 304 which rotates turntable 300. In a presently preferred embodiment, turntable 300 is rotated at an even multiple of the frame rate of the final image. If the final image has a frame rate of thirty frames per, turntable 300 is rotated at thirty revolutions per second, thus each projector 212 displays its image on screen 204 at its full frame rate.

The outer edge 308 of turntable 300 is inclined upwardly with respect to the base of turntable 300 and an aperture 312 is provided through outer edge 308 behind screen 204. Projectors 212 are inclined such that, when aperture 312 is in front of them, they can project an image through aperture 312 and on to screen 204. When aperture 312 is no longer in front of a projector 212, that projector's output is blocked by edge 308.

In the illustrated embodiment, eight projectors 212 are provided, although only one is illustrated in FIG. 5 for clarity, and as will be apparent to those of skill in the art, more or fewer projectors 212 can be employed as desired. If more projectors 212 are employed, it may be desired to vertically stagger the projectors and to provide additional, vertically and horizontally staggered apertures 312 in the edge 308 of turntable 300 to allow the projectors to be physically mounted within a reasonably small area.

To create a final image (either static or real time) for the embodiment of FIGS. 4 and 5, the process described above, with reference to FIG. 1, is employed for the viewpoint of each projector 212 to create the eight final images to be displayed.

It is presently preferred that aperture 312 be somewhat elliptical (having the major axis of the ellipse parallel to the base of turntable 300) to ensure that the final image is projected from a projector 212 onto screen 204 through a reasonable portion of the rotation of screen 204. When the above-described HoloPro™ rear projection screens are employed as screen 204, screen 204 can display a reasonable image when it is rotated as much as twenty two and a half degrees off axis from the centerline of a projector 212, thus allowing screen 204 to rotate through as much as forty five degrees while displaying the final image. While eight projectors 212 can thus provide project images for a full three hundred and sixty degrees of viewing, aperture 312 is preferably sized such that it rotates from being in front of one projector 212 to being in front of another projector 212, there is a period wherein the output of both adjacent projectors 212 is blocked. In this manner, no confusing overlap of two images occurs on screen 204 while turntable 300 rotates.

In a presently preferred embodiment, a viewing angle limiting screen 316, such as a vertical louver screen, is also positioned in front of screen 204. While not essential, screen 316 is presently preferred as it obscures the final image on screen 204 from viewers who are too far off the intended viewing angle of the final image on screen 204 and who might otherwise experience a less than satisfactory viewing.

The present invention is believed to provide significant advantages over two dimensional displays for purposes such as advertising and marketing, museum displays, educational system, etc. wherein the extra attention that a three dimensional display can attract will be most beneficial. By producing a final image which has been tailored to exploit appropriate characteristics of the human visual perception system, a simple yet effective display is obtained.

The above-described embodiments of the invention are intended to be examples of the present invention and alterations and modifications may be effected thereto, by those of skill in the art, without departing from the scope of the invention which is defined solely by the claims appended hereto.

I claim:

1. A method of creating a final image which, when displayed at a target location, is perceived by viewers as being three dimensional, comprising the steps of:
   (i) selecting a target location for the display at a display site and surveying the display site to identify and characterize light sources and objects which would result in visual highlights on a object displayed at the target location, the identified and characterized lights and objects employed in a computer animation system to light a model of the at least one object to be displayed;
   (ii) capturing video of at least one object to be displayed in the final image under a recreation of the characterized light sources and objects surveyed at the target location, the at least one object moving in the video at a necessary perceptual speed by one of translating generally along a plane extending through the eyes of expected viewers, rotating generally about an axis perpendicular to said plane, or a combination thereof and obtaining the captured video by rendering a video image of the at least one object in said computer animation system;
   (iii) displaying the final image at the site onto a transparent screen positioned such that the final image appears at the target location in front of a background and such that the movement of the at least one object at the perceptual speed occurs.

2. The method of claim 1 wherein for rotation of the at least one object, the perceptual speed is in the range of from about 0.8% to about 10% of the size of the at least one object.

3. The method of claim 2 wherein for rotation of the at least one object, the perceptual speed is in the range of from about 1% to about 8% of the size of the at least one object.

4. The method of claim 3 wherein for rotation of the at least one object, the perceptual speed is in the range of from about 3% to about 5% of the size of the at least one object.

5. The method of claim 1 wherein for translation of the at least one object, the perceptual speed is in the range of from about 3% to about 12% of the size of the at least one object.

6. The method of claim 5 wherein for translation of the at least one object, the perceptual speed is in the range of from about 4% to about 6% of the size of the at least one object.

7. The method of claim 1 further comprising the step of capturing a wide angle photograph of the display site about the target location and applying the captured wide angle photograph as a reflection map to the captured video of the at least one object to create the final image.

8. The method of claim 7 wherein a panoramic photograph is captured.

9. The method of claim 7 wherein the wide angle photograph is obtained iteratively to update reflections on the final image as the surrounding environment changes about the target location.

10. The method of claim 1 wherein a mocking stage is constructed to recreate the light sources and objects identified and characterized, the object is placed on said mocking stage in front of a chromakey backdrop and the video of the object is captured and the background removed by a chromakey process to obtain the captured video.

11. The method of claim 1, further comprising the step of capturing a wide angle photograph of the display site about the target location and applying the captured wide angle photograph as a reflection map during the rendering process.

12. The method of claim 1 wherein the necessary perceptual speed of the at least one object is such that movement of a point on the object along the plane of the expected viewers eyes occurs at a rate of about at least three percent of the size of the object, measured through that plane, per second relative to the background.

13. The method of claim 12 wherein the necessary perceptual speed of the at least one object is about at least five percent of the size of the object, measured through that plane, per second relative to the background.

14. The method of claim 1 wherein the necessary perceptual speed of the at least one object is rotational movement of the object about an axis not exceeding 40 degrees from an axis orthogonal to the plane of the expected viewers eyes.

15. The method of claim 1 wherein the necessary perceptual speed of the at least one object is translation movement across the display along the plane of the expected viewers eyes.

16. The method of claim 1 wherein the necessary perceptual speed of the at least one object is a combination of translational movement and rotational movement.

17. The method of claim 1 wherein the background is a moving background image behind the screen and the necessary perceptual speed is the relative speed difference between the movement of the at least one object and the speed of the moving background image.

18. A system for displaying on a two dimensional display at a target location a final image of at least one object, the final image being perceived by viewers as a three dimensional image, comprising:
   survey data to identify and characterize light sources and objects which would result in visual highlights on a object displayed at the target location; a computer animation system to light a model of the at least one object to be displayed employing the identified and characterized lights and objects;

a transparent screen onto which the final image is displayed allowing a background behind said screen to also be viewed where not obscured by said final image;

a projector to display the final image onto the screen; and a video source providing a final image to the projector, the video source of the at least one object to be displayed captured under a recreation of the characterized light sources and objects surveyed at the target location, and the captured video is obtained by rendering a video image of the at least one object in said computer animation system and the final image having at least one object moving at perceptual speed upon said screen.

19. The system of claim 18 wherein the final image includes visual highlights on said at least one image corresponding to the surrounding environment at the target location.

20. The system of claim 19 further comprising a wide angle camera to intermittently capture a wide angle image of the surrounding environment from the target location and the video source employing the captured image as a reflection map to modify the visual highlights of the displayed final image.

21. The system of claim 18 further comprising at least four projectors and wherein the screen rotates such that a different one of each projectors displays a different final image on the screen at different times.

22. A method of having the human visual perception system perceive an observed image of at least one object on a two dimensional display at a target location as a three dimensional image, comprising the steps of:

(i) moving the at least one object in the image such that a point on the at least one object along a plane of the expected viewers eyes occurs at a perceptual speed;

(ii) applying visual highlights to the at least one object in the image by employing a computer animation system using a recreation of characterized light sources and objects surveyed at the target location, the visual highlights including specular highlight and shadows appropriate for the object at the target location and obtained by surveying a display site to identify and characterize light sources and objects which would result in visual highlights on a object displayed at the target location; and (iii) obtaining a wide angle image of the surroundings of the target location and applying this wide angle image as a reflection map to the final image of the at least one object and rendering a video image of the at least one object in said computer animation system.

* * * * *